Feb. 2, 1926.
J. F. O'CONNOR
1,571,685
FRICTION SHOCK ABSORBING MECHANISM
Filed Feb. 28, 1923
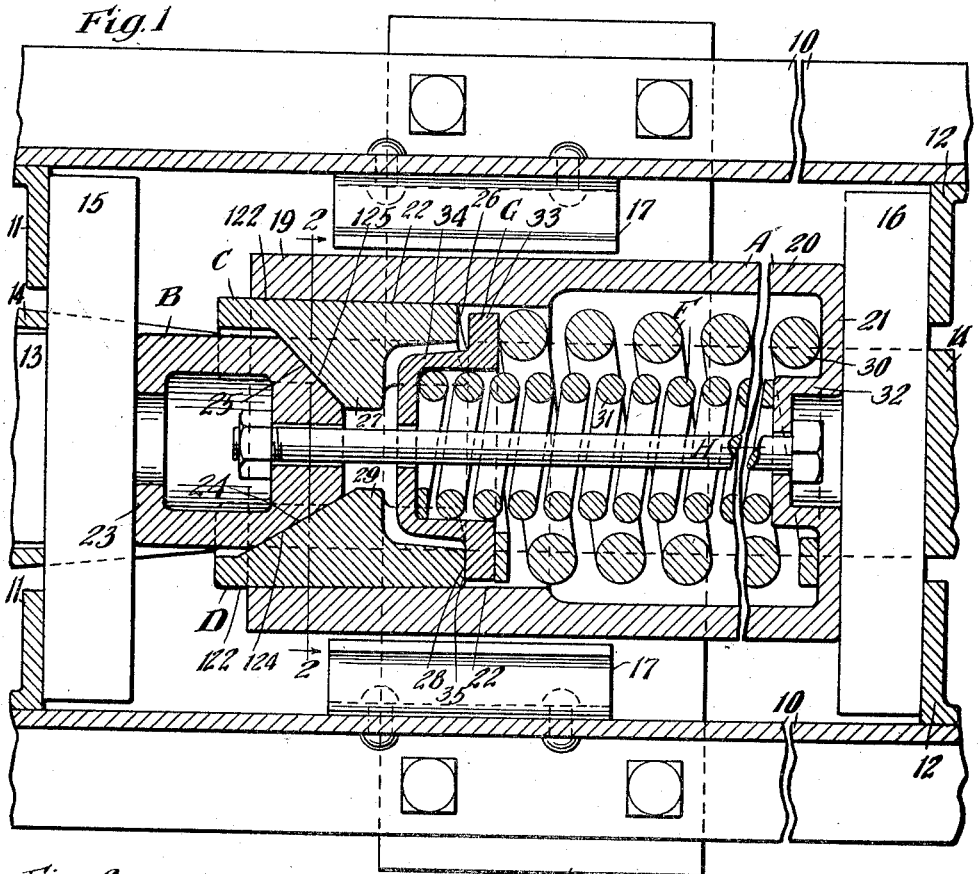
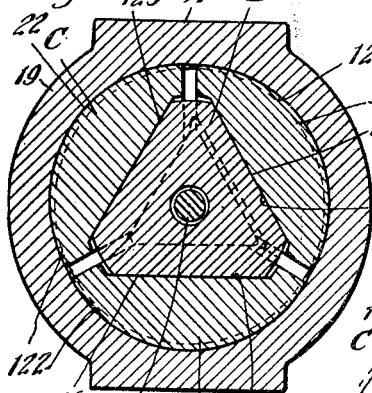
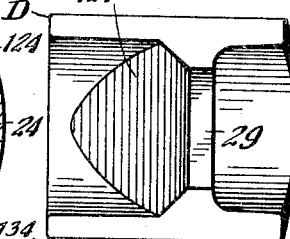
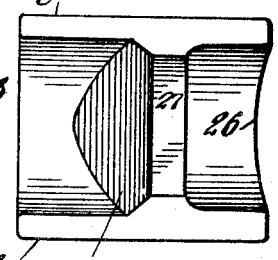
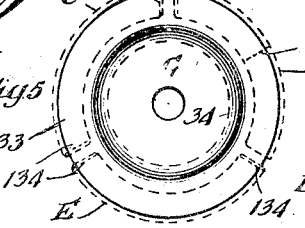
Witnesses
Wm. Geiger
Inventor
John F. O'Connor
By George I. Haight
His Atty.

Patented Feb. 2, 1926.

1,571,685

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed February 28, 1923. Serial No. 621,729.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings forming a part of this specification.

This invention relates to improvements in friction shock absorbing mechanisms.

One object of the invention is to provide a friction shock absorbing mechanism adapted to cushion extremely heavy shocks under high speed, and more particularly such a mechanism which is especially adapted for railway draft riggings.

Another object of the invention is to provide a mechanism of the character indicated, wherein are employed a pressure-transmitting wedge and a plurality of wedge-friction-shoes cooperable therewith, with some of the engaging faces of the wedge and shoes differing in angle from each other, by reason of which there will be an unequal travel of the shoes induced during the compression stroke, but with the parts so arranged with relation to the usual spring resistance that all the parts, at the end of the release action, will be automatically restored to their true normal position and with the parts in condition to receive another compression.

A further and more specific object of the invention is to provide a friction shock absorbing mechanism, of the character indicated, employing a keen angle wedge-shoe and two blunt releasing angle wedge-shoes, wherein the parts as so arranged that the keen angle shoe has contact with the usual spring follower cap at a single point, substantially central of the width of the keen angle shoe, while the blunt angle shoes each have contact with the cap at two separated points with the four contact points of the two blunt angle shoes embracing more than half of the circumference of the spring cap, maintaining the spring cap in its proper position, that is, at right angles to the axis of the mechanism and without the possibility of the spring cap being tilted by the pressure of the spring.

Other objects and advantages of the invention will more clearly appear from the description and claims hereinafter following.

In the drawings forming a part of this specification, Fig. 1 is a longitudinal sectional view of a portion of a railway draft rigging, the section through the shell and friction elements therewithin corresponding to two section planes at approximately 120° apart. Fig. 2 is a vertical transverse sectional view corresponding substantially to the section line 2—2 of Fig. 1. Fig. 3 is a detail, plan view of the keen wedge friction shoe. Fig. 4 is a detail plan view of one of the blunt wedge friction-shoes. And Fig. 5 is a view of the spring follower cap looking at it from its forward side, indicating by dotted lines thereon the points of contact of the inner ends of the keen and blunt angle shoes therewith.

In said drawing 10—10 indicate the usual draft or center sills of a car under-frame, said sills being preferably of channel cross section and to the inner faces of which are secured front stop lugs 11 and rear stop lugs 12 of usual construction. A portion of a drawbar is indicated at 13, the same having operatively associated therewith a hooded cast yoke 14 of a well known form, and within which is disposed the shock absorbing mechanism proper, hereinafter described, a front main follower 15, and a rear main follower 16. The friction shock absorbing mechanism proper, illustrated in the drawing, is of that type employing a substantially cylindrical combined friction shell and cage and in order that it be maintained in proper central position, the draft sills 10 may have secured to the inner faces thereof, guide plates 17—17. The yoke and parts contained therein are supported in operative position by a detachable saddle plate 18.

The improved shock absorbing mechanism proper, as shown, comprises a combined friction shell and spring cage casting A; a pressure-transmitting wedge B; three friction shoes C, D and E; a spring resistance F; a spring follower or cap G; and a retainer bolt H.

The casting A is of generally cylindrical form having the friction shell proper 19 thereof formed at the open or front end. Rearwardly of the friction shell proper, the casting provides a cylindrical spring cage or casing 20 and at its rear end, the casting A has an integral transverse wall 21, bearing on the follower 16. The friction shell proper 19, is preferably of the following formation, as best illustrated by reference to Figs. 1 and 2. The interior of the shell 19, while of general cylindrical formation, is preferably composed of three true cylindrical surfaces 22, symmetrically arranged around the axis, and each of approximately 120° extent. Said cylindrical surfaces 22 are converged inwardly of the shell on a relatively slight taper and in such a manner that the inner ends of said three cylindrical surfaces 22 form a true circle. With this arrangement, the friction shoes, which have true cylindrical surfaces as hereinafter described, will maintain true surface contact with the shell, at all positions during a compression stroke.

The wedge B, through which the pressure is transmitted, is in the form of a hollow casting having a front transverse bearing face 23 engaging the front follower 15. At its inner end, said wedge B is provided with a true wedge face 24 and two other rearwardly converged inclined faces 25—25, all of said faces 24 and 25, as best shown in Fig. 2, being disposed around the center or axis of the wedge and giving to the wedge the appearance of a truncated, somewhat irregular triangular pyramid. It will be noted from an inspection of Figs. 1 and 2, that the three inclined faces 24 and 25 are so disposed that a transverse section taken through the wedge B, will intersect all three faces.

The two friction shoes C and E, preferably in the form of castings, are of like construction, each having an outer friction surface 122 which corresponds to a portion of a true cylindrical surface and which extends through an arc of approximately 120°. At the inner end each of the friction shoes C and E is provided with a concave face 26, the extreme end portions of which are adapted to bear on the spring cap G. On the inner side, that is the side nearest the axis of the shell, each shoe C and E is provided with a lateral enlargement 27 on the front side of which is provided a rearwardly and inwardly inclined face 125 corresponding in angle to and co-operating with one of the inclined faces 25, as clearly shown in Figs. 1 and 2.

The third or remaining friction shoe D is provided with a similar outer cylindrical friction surface 122 and a convex bearing face 28 at its rear end adapted to co-operate with the spring cap G and having contact with the latter at a point midway between the sides of said shoe. On its inner side the shoe D is provided with an inwardly projecting enlargement 29 having an inclined wedge face 124 corresponding in angle to and co-acting with the true wedge face 24 of the wedge B. The faces 125 and 124 of the shoes are so disposed that the front ends of the shoes will normally lie approximately flush with each other and extend a short distance outwardly beyond the end of the shell.

The spring resistance F, as shown, comprises an outer relatively heavy coil 30 bearing at its inner end against the wall 21 of the casting A and an inner relatively lighter coil 31 bearing at its inner end upon a hollow cup-like boss 32 formed integral with the end wall 21.

The spring follower or cap G is of general cup-shaped form, having a heavy annular flange 33 on the inner side of which is adapted to bear the front end of the outer coil 30. The spring follower or cap G has a forwardly extended, integral, cup-shaped section 34, the interior of which provides a bearing for the front end of the inner coil 31.

The retainer bolt H is anchored at its rear end within the boss 32 and at its forward end within a suitable recess provided within the wedge B, the latter and the spring follower G being suitably apertured to accommodate the shank of the bolt. The retainer bolt H not only serves to maintain the parts in assembled relation, but holds the parts under initial compression and may be utilized to adjust the parts to the proper length and maintain them in this position when under full release.

Assuming a buffing or compressing action applied to the draft rigging, the operation is as follows. As the wedge B is forced inwardly of the shell, there will be, initially, a slight movement of the wedge B inwardly with respect to the keen angle shoe D. During this initial action, the blunt angle shoes C and E will move longitudinally inwardly of the shell, substantially in unison with the wedge B, on account of the blunt, relatively non-wedging angle of the cooperating faces 25 and 125, thus advancing the shoes C and E longitudinally slightly ahead of the keen angle shoe D. The foregoing described initial action sets up the desired spreading action. As the parts continue their movement inwardly of the shell, there will be substantially no further slippage between the keen angle face 24 and 124, but, due to the tapering of the shell surface, the shoes must approach each other relatively, which is permitted by the shoe C and E moving inward with respect to the wedge B, the slippage occurring on the blunt angle faces 25 and 125. This differential action further advances the shoes C and E longitudinally ahead of the shoe D and the action so continues until the end of the compression stroke. During the compression stroke as above described, and due to the advancing of the shoes C and E relative to the shoe D, the spring follower cap G will be displaced or moved from the inner end of the shoe D. In this connection, special reference is made to Fig. 5, wherein it will be noted that the points of contact, as indicated at 134—134, between the inner ends of the two blunt angle shoes C and E with the flange 33 of the spring cap G are four in number and embrace in extent approximately 240° of the circumference of the spring cap, that is, the points of contact of the shoes C and E with the spring cap are so spaced that the shoes together span more than half of the circumference of the spring cap flange 33. With this arrangement, the two shoes C and E advancing together in unison, the spring cap G is maintained in its proper position, that is, at right angles to the axis of the mechanism, and without the possibility of the spring cap being tilted by the pressure of the spring. In this connection it is pointed out that the inner convex end of the keen angle shoe D is adapted to contact at one point only with the flange 33 of the spring cap G, as indicated at 35 in Fig. 5. While the spring follower or cap G is out of engagement with the inner end of the keen angle shoe D during the compression stroke, as hereinbefore described, nevertheless, it will be apparent that the shoe D always affords resistance because of the friction between the surface 122 thereof and the shell surface 22, this friction acting to retard the shoe D with gradual increasing forces during the compression stroke. The friction shell, being of metal, is capable of a limited amount of radial expansion which takes place during the compression of the mechanism. The degree of taper of the shell is such that the expansion of the latter cannot neutralize the taper and therefore a differential action is assured.

Upon removal of the actuating or compressing force, there is an additional releasing action induced by the inward contraction of the shell. The forces exerted by this contraction produce a relative approach towards the center line of the mechanism of all three shoes, and this in turn, causes the pressure-transmitting wedge B to be squeezed out from between the shoes, said action being facilitated by reason of the blunt angle faces 25 and 125 of the wedge and blunt shoes respectively. The contraction of the shell continues until the shell has either resumed its normal condition or until the contracting forces have been reduced to a point where the energy stored up in the spring exceeds the longitudinal resistance to release the same. The initial release action, just described, results in loosening the wedge B sufficiently to permit the reduction of the pressure between the friction surfaces of the shoes and the shell friction surfaces, whereupon the spring becomes effective to start moving all the friction shoes outwardly of the shell. At the beginning of the outward movement just referred to, the spring follower cap G will move the two blunt angle shoes C and E in an outward direction, which in turn forces out the wedge B sufficiently to loosen the keen wedge faces 124 and 24 so that immediately thereafter, when the flange of the spring follower or cap G picks up the inner end of the keen angle shoe D, the same will also be moved out longitudinally thereby. The outward movement referred to continues until the wedge G is limited against further movement by the bolt H. The three shoes will then be forced into their normal position and, on account of the pressure being applied at widely separated points over the greater portion of the area of the spring follower by the contacting points of the two blunt angle shoes which maintain the former perpendicular to the axis, all three shoes will be brought to rest with their outer ends flush as best shown in Fig. 1.

As is well known to those skilled in the art, the friction shoes of shock absorbing mechanisms are ordinarily not machined on account of the expense involved and consequently certain irregularities in the casting or forming of the parts are sometimes unavoidable. By making the inner or rear ends of the two blunt angled shoes concave, as hereinbefore described, I provide a factor of safety for insuring an extended arc of contact through approximately 240° inasmuch as I am assured of two points of contact at the remote edges of the two blunt angled shoes, and obviously without any increased expense. In the case of shoes having nominally straight inner or rear ends, it might happen that an irregularity in the form of a projection or protuberance would occur on one or both of the blunt angle shoes, which would tend to lessen the extent of the arc of contact between the blunt shoes and the spring cap.

I have herein illustrated the preferred manner of carrying out my invention, but all such changes, modifications and variations are contemplated that come within the scope of the claims appended hereto.

I claim:

1. In a friction shock absorbing mechanism, the combination with a friction shell having interior friction surfaces arranged circularly; of a series of friction shoes within and cooperable with said shell and arranged in a circular series; a spring resistance; a spring follower; spreader means cooperable with said shoes, said shoes and spreader means having a plurality of cooperable sets of faces, part of which are arranged at a relatively keen wedge acting angle and others at a relatively blunt releasing angle, said shoes having the blunt faces having contact with said spring follower at widely spaced intervals only more than a half circumference of said cap being embraced between the extreme intervals of contact of the shoes and said cap.

2. In a friction shock absorbing mechanism, the combination with a friction shell having interior friction surfaces arranged circularly; of a series of friction shoes within and cooperable with said shell and arranged in a circular series; a spring resistance; a spring follower; spreader means cooperable with said shoes, said shoes and spreader means having a plurality of cooperable sets of faces, part of which are arranged at a relatively keen wedge acting angle and others at a relatively blunt releasing angle, each of said blunt-faced shoes having the inner edge thereof bearing on said spring follower at widely spaced intervals, remote from the central portion of said end edge said points of bearing contact of all of said blunt shoes embracing more than a half circumference of said cap.

3. In a friction shock absorbing mechanism, the combination with a friction shell having interior friction surfaces arranged circularly; of a series of friction shoes within and cooperable with said shell and arranged in a circular series; a spring resistance; a spring follower; and spreader means cooperable with said shoes, said shoes and spreader means having a plurality of cooperable sets of faces, part of which are arranged at relatively keen wedge acting angles and others at a relatively blunt releasing angle, said spreader means comprising a single pressure transmitting block, and each of said shoes having the blunt faces bearing contact on said follower at a plurality of widely spaced intervals, the distance spanned by said shoes between the extreme intervals of contact thereof embracing more than a half circumference of said cap.

4. In a friction shock absorbing mechanism, the combination with a friction shell having interior friction surfaces arranged circularly; of a series of friction shoes within the shell, cooperable with the friction surfaces thereof and arranged in a circular series; a spring resistance; spreader means cooperable with said shoes, said shoes and the spreader means having a plurality of cooperable sets of faces, part of which are arranged at a relatively keen acting angle and others at a relatively blunt releasing angle and whereby certain of the shoes will be advanced longitudinally inwardly of the shell a greater distance than the remainder of the shoe; and a spring follower interposed between said spring and the inner ends of the shoes, each of said shoes having the greater longitudinal travel bearing on said spring follower at remote intervals, to maintain the spring follower perpendicular to the axis of the mechanism at all times.

5. In a friction shock absorbing mechanism, the combination with a friction shell having interior friction surfaces arranged circularly, said shell friction surfaces converging inwardly of the shell; of a series of friction-shoes within and co-operable with the shell friction surfaces and arranged in a circular series; a spring resistance; spreader means cooperable with said shoes, said shoes and spreader means having a plurality of cooperable sets of faces, part of which are arranged at a relatively keen wedge acting angle and others at a relatively blunt releasing angle and whereby certain of the shoes will be advanced longitudinally inwardly of the shell a greater distance than the remainder of the shoes; and a spring follower interposed between said spring and inner ends of the shoes, the contact between said spring follower and said shoes having the greater longitudinal travel, being localized adjacent the side edges of each of said last named shoes to maintain the spring follower perpendicular to the axis of the mechanism at all times.

6. In a friction shock absorbing mechanism, the combination with a friction shell having interior inwardly converging friction surfaces, said surfaces being arranged circularly; of a plurality of friction shoes cooperable with said shell friction surfaces and arranged in a circular series; a spring resistance; a pressure-transmitting wedge disposed between and cooperable with said shoes, one of said shoes and wedges having cooperable faces extending at a relatively acute angle with respect to the axis of the mechanism, and another opposed friction shoe and the wedge having cooperating faces inclined at a relatively blunt angle with respect to the axis; and a spring follower interposed between said spring resistance and the shoes, said spring follower having engagement with the inner end of the keen angle shoe between the longitudinal side edges thereof, inwardly of said edges.

7. In a friction shock absorbing mechanism, the combination with a friction shell having cylindrical interior friction surfaces; of a spring resistance; three friction shoes arranged in a circular series, each shoe extending through an arc of approximately 120°, one of said shoes having a keen angle wedge face and the remaining two shoes having inclined faces extending at a relatively blunt angle with respect to the axis of the shell; pressure-transmitting wedging means having correspondingly inclined faces cooperating with those of the shoes; and a spring follower interposed between the inner ends of the shoes and the spring and with which the inner end of each of the blunt angle shoes has contact at spaced intervals, the span of said contact with the blunt shoes extending for an arc of approximately 240°, whereby said follower is maintained always substantially perpendicular to the axis of the shell.

8. In a friction shock absorbing mechanism, the combination with a friction shell having cylindrical interior friction surfaces; of a spring resistance; three friction shoes arranged in a circular series, each shoe extending through an arc of approximately 120°, one of said shoes having a keen angle wedge face and the remaining two shoes having inclined faces extending at a relatively blunt angle with respect to the axis of the shell, said blunt wedge shoes having concave faces at the inner ends thereof; a pressure-transmitting wedging means having correspondingly inclined faces cooperable with those of the shoes; and a spring follower interposed between the inner ends of the shoes and the spring.

9. In a friction shock absorbing mechanism, the combination with a friction shell having cylindrical interior friction surfaces; of a spring resistance; three friction shoes arranged in a circular series, each shoe extending through an arc of approximately 120°, one of said shoes having a keen angle wedge face and the remaining two shoes having inclined faces extending at relatively blunt angle with respect to the axis of the shell, said keen wedge shoe having a convex bearing face at the inner end thereof, and said blunt wedge shoes having concave faces at the rear ends thereof; pressure-transmitting wedging means having correspondingly inclined faces cooperable with those of the shoes; and a spring follower interposed between the rear ends of the shoes and the spring, said follower having an outer flat bearing face adapted to co-act with the rear ends of the blunt and keen angled shoes.

In witness that I claim the foregoing I have hereunto subscribed my name this 24th day of February 1923.

JOHN F. O'CONNOR.